United States Patent Office 3,843,539
Patented Oct. 22, 1974

3,843,539
ELECTROLYTIC SOLUTION FOR LEVEL DEVICES
Robert Willing and Gary L. Cooper, Anaheim, Calif., assignors to North American Rockwell Corporation
Filed June 26, 1972, Ser. No. 266,010
Int. Cl. H01g 9/02
U.S. Cl. 252—62.2
1 Claim

ABSTRACT OF THE DISCLOSURE

An electrolytic solution for use in a bubble level indicating device comprising an alcohol compound mixed with a volatile acid, a volatile base or a volatile salt resulting from the interaction of the volatile acid and base. A process for alignment of the bubble level device utilizes the electrolytic solution as a means for accurately determining the position of the component parts of the bubble device by balancing a pair of AC operated Wheatstone bridges connected to electrodes that sense orthogonal portions of the electrolyte film residue in the device that comprises the bubble therein.

UNITED STATES GOVERNMENT INTEREST

The invention herein described was made in the course of or under Air Force Contract F04701-68-C-0162.

BACKGROUND OF INVENTION

1. Field of the Invention

The present invention relates to the field of electrolytic solutions as used in bubble type level indicators and the method of aligning such indicators with the electrolytic solution sealed therein.

The invention to be disclosed allows liquid level sensors to be fabricated in a rapid manner, free of contaminating sources associated with previously used electrolytes.

2. Description of the Prior Art

In order to produce an electro-mechanical bubble level type gravity sensor which has a very close alignment between the electrolytic bridge null and a stable mechanical reference surface, final adjustments must be made to the components before their positions are fixed by adhesive bonding, glass fusion, welding, or the like.

Nearly all sensitive bubble level sensors utilize alcoholic working fluids. This is because alcohols exhibit a substantially zero contact angle on many surfaces and the interfacial tension is similar for a wide range of solid substrates. Nevertheless, high-precision fluid levels are so sensitive to surface tension effects that slight contamination on the working surface can cause a significant offset and lead to instability. For an electromechanical bubble level, alcohol has the indispensable property of dissolving some salts, notably potassium iodide, to form relatively stable conducting solutions.

A certain time is required for the sensor bubble to overcome the viscous damping of the working fluid and assume a position sensibly identical with its final position. Further time to clear the inner working surface of window-shading films of fluid may be required. This settling time, other factors aside, is directly proportional to the absolute viscosity of the fluid and inversely proportional to the density of the fluid.

Settling time is thus seen to be a direct function of what is commonly called kinematic viscosity, which is the ratio of viscosity to density and is directly measured with the Ubeholde-type viscosimeter.

SUMMARY OF THE INVENTION

Objectives of this invention would therefore be to select an electrolytic fluid with the following properties: (1) It should be completely volatile, i.e. there should be no residue upon evaporation. (2) The surface tension properties should be substantially identical with alcoholic solutions of neutral salts such as potassium iodide. (3) It should have the lowest possible kinematic viscosity so the time spent in alignment settling will be as low as possible. (4) The electrolytic fluid evaporation rate should be relatively rapid, so the device could be subjected to further processing without delay. (5) Electrolytic fluid residue in the internal chamber of bubble level device should be completely evaporated. That is, droplets of moisture condensed from moist ambient air should not remain. A solvent which azeotropes with water would be desirable. (6) Conductivity should be adequate to match the final fill electrolyte where such final electrolyte is used, and the conductivity of the electrolyte should be capable of being increased. Higher conductivity permits easy dissolving of enough electrolytic salts to achieve an adequate working conductivity, and a higher working conductivity permits quicker, but less sensitive aligning. (7) The electrolyte and its vapors should not be corrosive to ordinary materials of construction, and should be stable indefinitely in the sealed container.

Hence, in accordance with the objectives of this invention hereinabove outlined, an electrolytic solution is provided which comprises at least one alcohol selected from the group consisting of an alcoholic compound and a volatile ionizable compound consisting either of volatile acids, volatile bases or volatile salts. The volatile acids may be inorganic containing chlorine, bromine or iodine elements, or may be of the organic type. The volatile salts are the reaction compounds which result from the reaction of any of the volatile bases and any of the volatile acids. Examples of the volatile acids are carbonic, formic, acetic, propionic, butyric, pentanoic, hydrogen chloride, hydrogen bromide and hydrogen iodide. Examples of volatile bases are pyridine, ammonia, diethylamine and trimethylamine, monopropylamine, monobutylamine, and monohexylamine. It would also be desirable to provide the electrolyte with the solution wherein the resistivities thereof would be in a range of 70–2500 ohm-centimeters at 24° C. Provisions for using this electrolytic solution in a bubble level indicating device would include steps of (1) clamping parts of the bubble level indicator together; (2) injecting the electrolytic solution into the device; (3) measuring the resistance of the fluid at the bubble level indicator by means of two bridges wherein the fluid substance, per se, constitutes component resistances of the bridges, and aligning the device so as to enable the obtaining of a null indication on each of the bridges. (4) Upon alignment, the component parts of the bubble level indicator are sealed and thereby fixed in position. (5) If a permanent fluid is desired, the electrolytic solution is purged from the level indicator, a permanent electrolyte is injected into the device, and the entryway through which the electrolyte is injected or purged, is then permanently sealed.

EXEMPLARY EMBODIMENT

Figure 1:
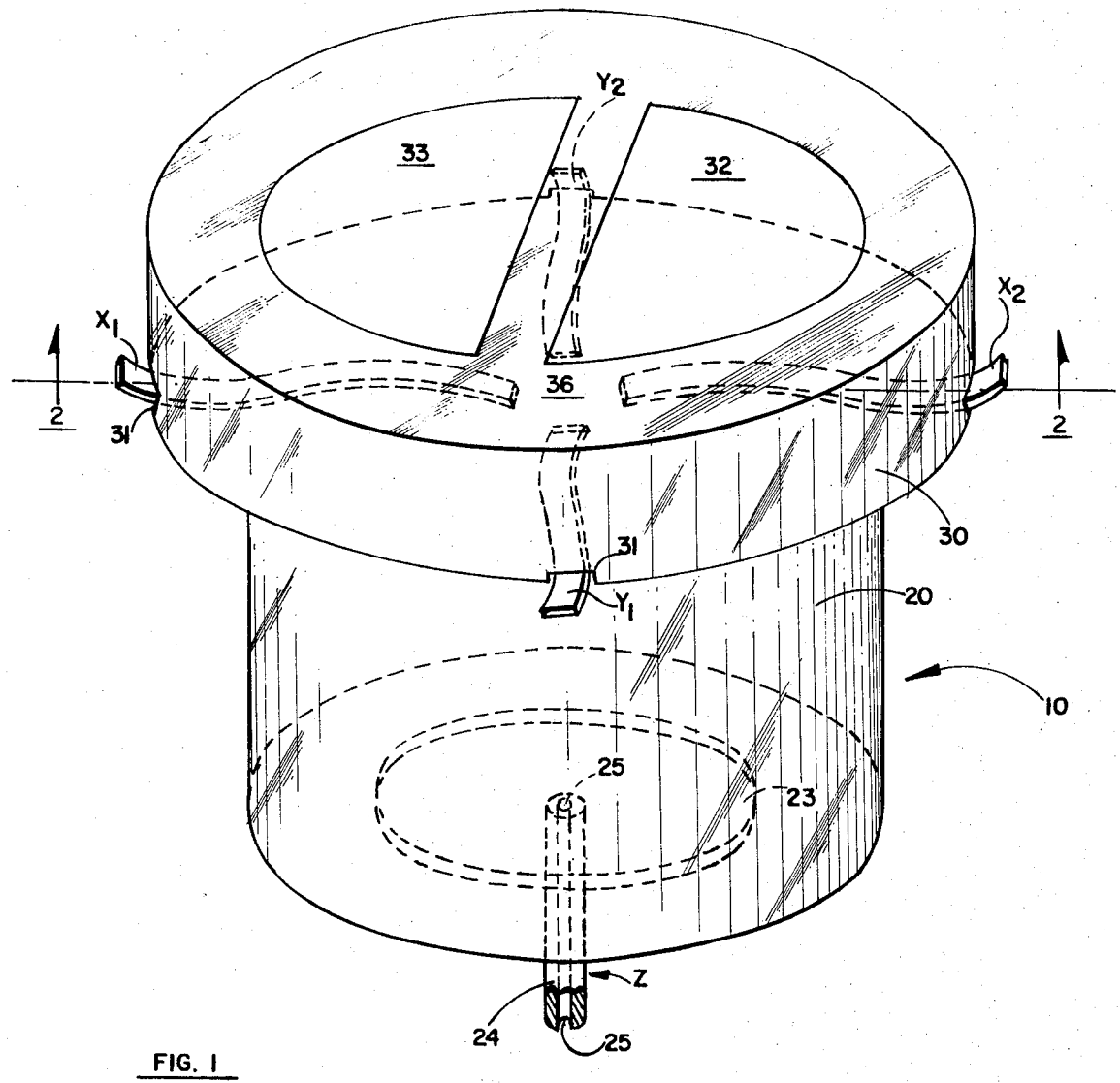
FIG. 1 is a perspective view of a bubble level indicator showing details of a body portion with fluid injection means therein and a planar portion which has two pair of electrodes.
Figure 2:
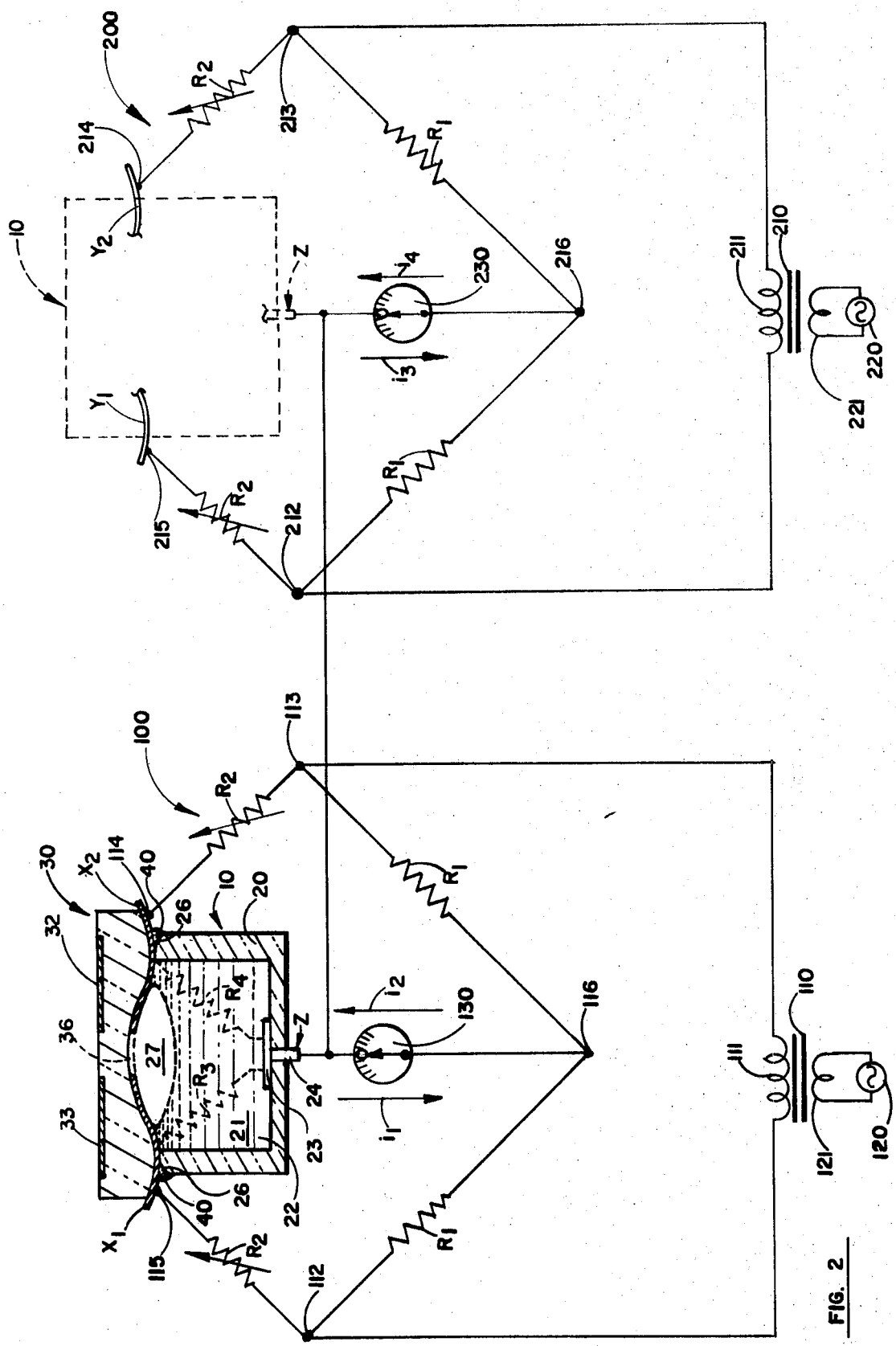
FIG. 2 is a schematic view of two AC operated Wheatstone bridges wherein a cross-section taken at plane 2—2 in FIG. 1 is shown as operative elements of the circuit in this schematic.

Referring to FIGS. 1 and 2, a bubble level device is shown at 10. A body portion 20 is provided, which has a hollowed inner portion 21, and in which the electrolytic fluid 22 is retained. The electrolytic fluid 22 is understood to be either the inventive electrolytic fluid or the permanent electrolytic fluid as hereinbelow described. Body 20 is fitted with conductive member Z, which is fitted in the base of body 20 with a circular portion 23 thereof on the inside of the body, and a vertical member 24 thereof, perpendicular to the circular member, extending from the body to the outer surface thereof. Member 24 is provided with bore 25 therethrough, extending from the outside of the body through circular member 23 so as to enable the injection and/or purging of the electrolytic fluid therethrough. The upper portion of body 20 is cylindrically configured with the upper lip of the cylinder outwardly tapered as at 26. When upper portion 30 is in initimate cooperation with the upper portion of body 20, electrolytic fluid 22 may be injected through bore 25 into the inner cavity 21. The fluid will form a bubble as at 27. Of course, initially, when the bubble level device is in misalignment, the bubble will naturally not be centered as shown in FIG. 2.

Planar portion 30 is shown exaggerated in curvature insofar as its electrodes are concerned in order to facilitate understanding of the invention. In the actual device the curvature of members $X_1-X_2$ and $Y_1-Y_2$ are not as great. The X and Y elements are attached in grooves 31 provided therefor in the undersurface of member 30. In order to facilitate the alignment of the device, insofar as obtaining a horizonal positioning of the device on a stable platform, wherein it is used, mirror portions 32 and 33 are embedded in the upper surface of planar member 30. This enables autocollimating light to be directed at the geometric center midway between the terminal portions of the electrodes as at 36, in a vertical direction perpendicular to the autocollimating platform and hence the earth's gravitational field. It follows that the autocollimating light should be in alignment with member Z. Member 30 is preferaby made of glass material which is non-reactive with electrolytic solution in the bubble device. It should be noted that with the electrolytic solution 22 within cavity 21, the electrolytic solution being electrically conductive, it is possible to make connection of the device to a pair of AC operated Wheatstone bridges, and the resistances $R_3$ and $R_4$, shown in fluid 22, are representative of the resistances between member Z and conductive members $X_1$ and $X_2$. Since two bridges will be involved in the embodiment, similar resistances $R_3$ and $R_4$ will appear between member Z and conductive electrodes $Y_1$ and $Y_2$ of the device.

With specific reference to FIG. 2, two identical bridge circuits are shown at 100 and 200. Each of these bridges are respectively connected between common electrode Z and electrode pairs $X_1-X_2$ and $Y_1-Y_2$. With respect to circuit 100 in which $X_1-X_2$ appears, the bridge thereof consists of arm pair $R_1$ and adjustable arm pair $R_2$, as well as fluid resistances $R_3$ and $R_4$. One of the resistances $R_1$ is connected between terminals 112 and 116. The other resistance $R_1$ is connected between terminals 113 and 116. With respect to circuit 200, $R_1$ therein is connected between terminals 212 and 216 and the other resistance $R_1$ is connected between terminals 213 and 216. With respect to adjustable resistances in circuit 100, one resistance arm $R_2$ is connected between terminals 112 and 115 and the other adjustable resistance $R_2$ is connected between terminals 113 and 114. It should be noted that terminals 115 and 114 are respectively electrodes $X_1$ and $X_2$. With respect to circuit 200, one adjustable resistance $R_2$ is connected between terminals 212 and 215 and the other adjustable resistance $R_2$ is connected between terminals 213 and 214. It should be noted that terminals 215 and 214 are respectively electrodes $Y_1$ and $Y_2$ of the bubble device. With these connections so made, electrode pairs $X_1-X_2$ are present in circuit 100 and electrode pairs $Y_1-Y_2$ of the device are present in circuit 200. Member Z is common to both circuits 100 and 200 and is connected to null indicator 130 of circuit 100 and to null indicator 230 of circuit 200. The return side of null indicator 130 is connected to terminal 116, whereas the return side of null indicator 230 is connected to terminal 216. Power is provided to bridge circuit 100 by a transformer 110 having a secondary winding 111, the terminals of which are connected to terminals 112 and 113. Primary winding 121 thereof is powered by an alternating current source 120 which may optionally, depending upon the application in which the bubble level indicating device is used, have a power source of 5 kilocycles or 30 kilocycles. Power is provided to bridge circuit 200 by transformer 210 by connecting the secondary winding 211 to terminals 212 and 213. The primary winding 221 of transformer 210 is powered by an AC source 220 that may be either a 5 kilocycle or 30 kilocycle source.

Wheatstone bridge 100 is balanced by adjusting the position of planar member 30 with respect to member 20 until the bubble is positioned substantially at the center of the bubble level device, as indicated at 27, so that the bubble is evenly distributed with respect to the ends of electrodes $X_1$ and $X_2$ that are internal to the bubble level device. Similarly the bubble would be evenly distributed with respect to ends of $Y_1$ and $Y_2$ electrodes. The variable resistors $R_2$ of bridge 100 are adjusted until $i_1$ is equal and opposite to $i_2$ thereby causing meter 130 to center-balance at zero after the members 20 and 30 have been bonded to each other, as hereinbelow described. This finally and accurately adjusts for the resistivity of the bubble across the $X_1-X_2$ axis. Similarly and independently of the $X_1-X_2$ adjustment, bridge 200 is adjusted for obtaining final and accurate bubble resistivity across $Y_1-Y_2$ axis by setting $R_2$ resistances so that $i_3$ is equal and opposite to $i_4$ thereby obtaining a zero reading on meter 230.

Regarding the electrolytic fluid 22 used to align the bubble level device, the electrolytic fluid that best satisfies the requirements of a usable fluid is a blend of ethanol and methanol to which the necessary amount of ammonium carbonate has been added. A substantial range of mixtures has useful conductivity, proper surface energy, a kinematic viscosity lower than pure ethanol, sufficient azeotroping of water so evaporation is prompt and complete, high solubility limit of conductivity, and good stability.

Ammonia and its substituted derivatves, such as the organic-amines, give a useful but limited range of conductivities. As an example of an organo-amine, triethyl amine gives poorly conducting solutions, by contrast with its more strongly ionized behavior in water, except when used in high concentrations. Ammonia, added as the concentrated aqua solution, gives rise to water contents above the amount which pure ethanol will azeotrope. Several ammonium salts of strong inorganic acids are potentially useful but all are less volatile than ammonium carbonate, but the halide salts pose corrosion problems. Monoethyl and methyl amine carbonates and diethyl and dimethyl amine carbonates are all satisfactory, but their volatility would be inferior to ammonium carbonate.

When saturated with ammonium carbonate, ethanol and methanol form a series of conductive solutions as shown below.

TABLE 1
Examples of conductive solutions of several methanol-ethanol compounds saturated with ammonium carbonate

| Parameters | Types of electrolytic solutions | | | | | | |
|---|---|---|---|---|---|---|---|
| | Type 1 | Type 2 | Type 3 | Type 4 | Type 5 | Type 6 | Type 7 |
| Ethyl alcohol (part by volume) | 100 | 80 | 60 | 50 | 40 | 20 | 0 |
| Methyl alcohol (parts by volume) | 0 | 20 | 40 | 50 | 60 | 80 | 100 |
| Specific resistivity in ohm-centimeters taken at 24 degrees centigrade | 1,585 | 573 | 269 | 185 | 116.1 | 98 | 70 |
| Kinematic viscosity in centistokes taken at 25 degrees centigrade | 1.50 | 1.32 | 1.22 | 1.21 | 1.25 | 1.10 | 1.00 |
| Approximate saturation concentration expressed in grams of ammonium carbonate electrolyte per 100 milliliters of ethyl alcohol/methyl alcohol mixture | 1.0 | 1.8 | 2.5 | 3.5 | 5.0 | 4.8 | 5.1 |

Considering the type 3 example, the concentration of ammonium carbonate in a given alcohol-ammonium carbonate solution can be varied to change the specific resistivity of the solution. For example, Table 2 shows the variation in specific resistivity that results from varying the ammonium carbonate concentration in a 60/40 mixture of ethyl and methyl alcohol.

TABLE 2
Modification of electrolytic solution, Type 3

| Parameter | Type 3 | Type 3.1 | Type 3.2 | Type 3.3 | Type 3.4 | Type 3.5 | Type 3.6 | Type 3.7 | Type 3.8 | Type 3.9 |
|---|---|---|---|---|---|---|---|---|---|---|
| Percent saturation (2.5 gms./100 milliliters=100% ammonium carbonate for 60 units of ethyl alcohol and 40 units of methyl alcohol) | 100 | 80 | 61 | 43.6 | 31 | 20.8 | 13.8 | 11.9 | 9.2 | 8.7 |
| Specific resistivity in ohm- centimeters at 24 degrees centigrade | 269 | 296 | 396 | 528 | 726 | 1,040 | 1,560 | 1,800 | 2,360 | 2,500 |

Volatile alcohols, which are classified as mono alcohols and glycols, volatile bases and acids are stated in Table 3, as follows:

TABLE 3
High volatile compounds used in the electrolytic solution

| Mono alcohols | Glycols | Bases | Acids |
|---|---|---|---|
| Methyl. | Ethylene glycol. | Gaseous | Organic |
| Ethyl. | | Ammonia. | Carbonic. |
| Propyl. | | Methyl amine. | Formic. |
| Butyl. | | Dimethyl amine. | Acetic. |
| Pentyl. | | Trimethyl amine. | Propionic. |
| Hexyl. | | Ethyl amine. | Pentanoic. |
| | | | Hexanoic. |
| | | Non-gaseous | Inorganic |
| | | Pyridine. | Hydrogen chloride. |
| | | Propyl amine. | Hydrogen bromide. |
| | | Dipropyl amine. | Hydrogen iodide. |
| | | Tripropyl amine. | |
| | | Butyl amine. | |
| | | Diethylamine. | |

Marginal volatile alcohols and bases are stated in Table 4. Such marginal volatile substances are particularly good when the electrolytic solution is used as a permanent electrolyte in the bubble level device inasmuch as the solution will retain stability indefinitely.

TABLE 4
Marginal volatile compounds used in the electrolytic solution

| Mono alcohols | Glycols | Bases | Acids |
|---|---|---|---|
| Heptyl. | Propylene glycols. | Di butyl amine. | Any of the acids stated in Table 3. |
| Acetyl. | Butylene glycols. | Tri butyl amine. | |
| Nonyl. | Pentane diols. | | |
| Decyl. | Hexane diols. | | |
| Undecyl. | | | |
| Dodecyl. | | | |

Hence, any of the alcohols, and more than one may be used, which alcohols include the glycol group, wherein the above-listed mono alcohol groups may be specified by the formulation $C_nH_{(2n+1)}OH$ wherein $n$ is an integer ranging between 1 and 12. The above-listed groups entitled glycols have the formulation $C_mH_{2m}[OH]_2$ wherein $m$ is an integer ranging between 2 and 6.

The inorganic acids of the halogen group are restricted to those acids containing chlorine, bromine or iodine.

The organic acids used herein are of the class having the formulation $C_rH_{(2r+1)}COOH$ wherein $r$ is an integer ranging between 0 and 5.

The volatile bases will have the formulation $$[C_qH_{(2q+1)}]_pNH_{(3-p)}$$

where $q$ is an integer having a range between 1 and 4, and $p$ is an integer having a range between 0 and 3.

Volatile salts used herein are the reaction products resulting from the interaction of any of the volatile bases with any of the volatile acids, as aforesaid.

All of the compounds shown in Tables 3 and 4 have appreciable vapor pressure, and will evaporate, or, like the lower amines, some are gases at room temperature.

Since ethanol azeotropes water, and methanol does not, it is preferable to incorporate some ethanol or other higher alcohol in electrolytes for temperorary use. From the aforementioned viscosity data, it will be seen that 40% methanol will impart as much benefit to settling time as 60% methanol, thus making this general range of concentrations a preferred embodiment. It is well known that higher alcohols azeotrope even more water than does ethanol and could be used, provided the alcohol was selected to provide an interfacial tension similar to any subsequent electrolyte, and settling requirements were not excessively affected.

Experience has shown that methanol-ethanol ammonium carbonate mixtures in the mid-range of concentrations provide excellent matches to the performance of ethanol-potassium iodide electrolytic solutions to the limit of routine measurement reproduction of approximately one second of arc tilt. It is of further interest that the ammonium carbonate solutions may have utility as permanent electrolytes, since the electro-chemical potential barrier for the initial degradation of conventional potassium iodide electrolyte, based upon $$KI \xrightarrow{e^-} K^+ + \tfrac{1}{2}I_2,$$

is lower than for the degradation of ammonium carbonate via $$NH_4^+ \xrightarrow{e^-} NO_3^- + H^+.$$

Substituted amines are stronger bases than ammonia, at least in water solution, so we may expect their hydrohalides to have a somewhat lower vapor pressure than ammonia. Amine hydrohalides of higher molecular weight than diethylamine hydrochloride are slow to vaporize.

The materials stated above are compatible with the materials of which the bubble level device is constructed.

Only methanol, of all the alcohols, attacks certain epoxy resins. Therefore, even methanol-containing electrolytic solutions can be totally compatible if the epoxy resins are carefully selected. Epoxy resins formulated with aromatic amines, and there are a multitude of those compounds available, will make even the methanol-containing electrolytic solution totally compatible.

As in the use of appropriate epoxy resin for sealing the device, when methanol is used as part of the permanent fluid, if one of the halogen-element-containing acids are used as part of the permanent electrolytic solution as well as for alignment purposes, it is to be noted that an epoxy resin which is acid-anhydride cured may be used for sealing the device which will be able to sustain attack upon the epoxy bond per se as well as upon the glass substance of which the device is constructed.

With respect to the procedural steps of aligning the bubble level device:

(1) All the inner surfaces of body 20 and the surfaces of planar member 30 are cleaned and dried.

(2) Members 20 and 30 are clamped together in a fixture made to seat on an autocollimation table. The bridges as shown in FIG. 2 are already electrically connected, as above described, to device 10.

(3) The electrolytic solution, above described, is injected into bore 25. The fluid in cavity 21 is held by capillary forces since bore 25 is only approximately 0.030 inches in diameter.

(4) The autocollimation ultra-violet beam is made perpendicular to its table, and hence perpendicular to mirror surfaces 32 and 33, and is then projected onto device 10, impinging preferably at 36. To adjust, so that device 10, already clamped to the table, is perpendicular to the autocollimation beam, the table is tilted and adjusted for orthogonality relationship between beam and mirrored surfaces 32 and 33.

(5) The clamp screws holding device members 20 and 30 together are then loosened and member 20 is slid with respect to member 30 until null readings on meters 130 and 230 are obtained. This guarantees that the electrical center of the bubble has been found, which should also be the geometric center of member 30, but that is not absolutely true in all instances.

(6) The clamp set screws for members 20 and 30 are now retightened so that members 20 and 30 may be sealed or bonded together in the aligned position.

(7) Device 10 and clamped members 20 and 30 are then removed from the autocollimation table.

(8) If the electrolytic solution is to be used as a permanent solution in device 10, then the outer periphery at points of contact 26 of members 20 and 30 are sealed or bonded to each other, with an epoxy resin, or the like, forming the bond as shown at 40. It should be noted that the epoxy material will extend midway across the upper lip of the wall of 20, but will not extend into chamber or cavity 21, thereby guaranteeing freedom from contamination due to the sealant used, and encountered in previous methods of sealing. In this case, member Z may be crimped at its outer extended portion, and device 10 is ready for mounting on a stable platform for alignment thereof as required.

(9) If the electrolytic solution is only used as a temporary solution, then it will have to be replaced by bypassing step (8), above, and instead attaching a source of dry gas or air to member Z and injecting the gas into the device to purge the electrolytic solution therefrom. Due to the pressure applied, the solution will purge between the contacting surfaces of members 20 and 30 and also in the vicinity of aperture 25. The bonding or sealing process is then performed as descrbed in step (8), device 10 is then loaded with the particular permanent fluid to be used therein by injection of the fluid through bore or port 25, then the bore is sealed by crimping member 24 closed at its lower extremity.

What is claimed is:

1. An electrolytic solution for a level indicating device, consisting essentially of:

a fluid consisting of approximatey 40–60 parts by volume of ethyl alcohol and the rest methyl alcohol; and ammonium carbonate of sufficient concentration to adjust the resistivity of said fluid to approximately 70–2500 ohm-cm. at 24° C.

References Cited

UNITED STATES PATENTS

| | | | |
|---|---|---|---|
| 2,198,494 | 4/1940 | Georgiev | 252—62.2 |
| 2,749,487 | 6/1956 | Jenny et al. | 252—62.2 X |
| 3,346,782 | 10/1967 | Alwitt et al. | 252—62.2 X |
| 3,003,089 | 10/1961 | Bernard et al. | 252—62.2 X |

OTHER REFERENCES

Seidell & Linke "Solubilities of Inorganic & Metal Organic Compounds", Vol. II, 4th ed., P. 649, 1965.

Barber et al. "Chemical Abstracts," Vol. 45, P. 2821e 1951.

JACK COOPER, Primary Examiner

PO-1050
(5/69)

UNITED STATES PATENT OFFICE
CERTIFICATE OF CORRECTION

Patent No. 3,843,539  Dated October 22, 1974

Inventor(s) Robert Willing et al

It is certified that error appears in the above-identified patent and that said Letters Patent are hereby corrected as shown below:

Column 6, line 49, "electro-chemical" should read --electro-mechanical--.

Signed and sealed this 21st day of January 1975.

(SEAL)
Attest:

McCOY M. GIBSON JR.
Attesting Officer

C. MARSHALL DANN
Commissioner of Patents